April 1, 1924.  W. WALTHER  1,488,722
MAGNETO IGNITING DEVICE WITH REVOLVING FLUX CONDUCTOR
Filed Aug. 26, 1919
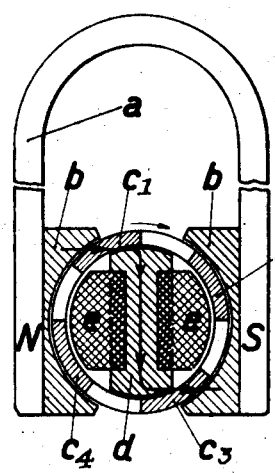
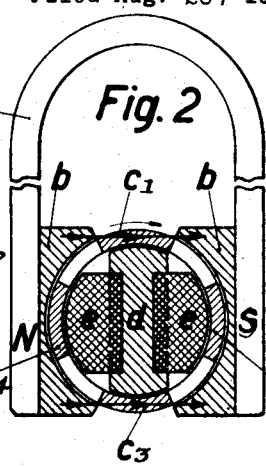
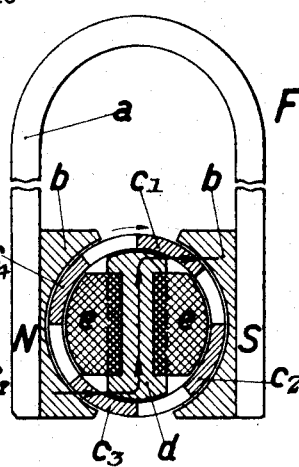
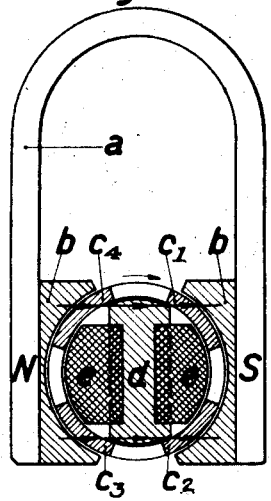
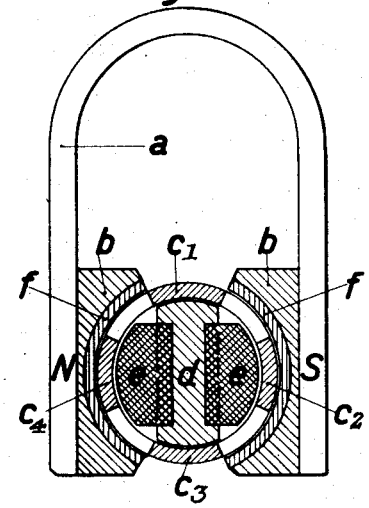
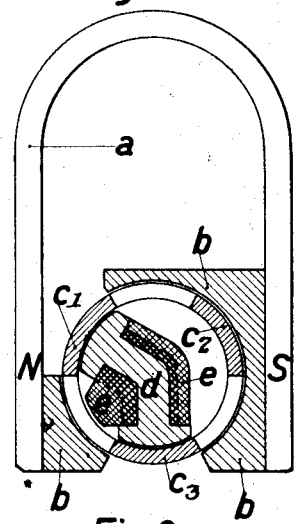
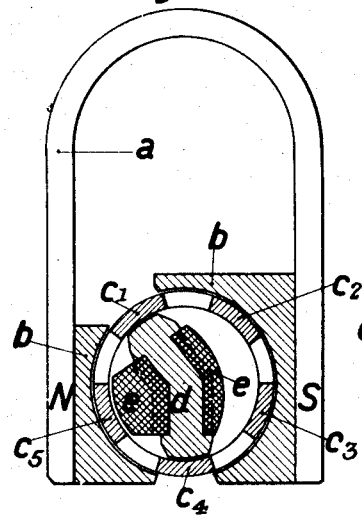
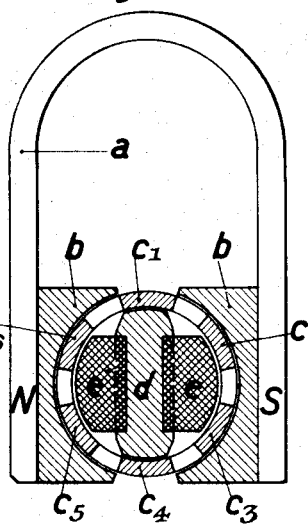
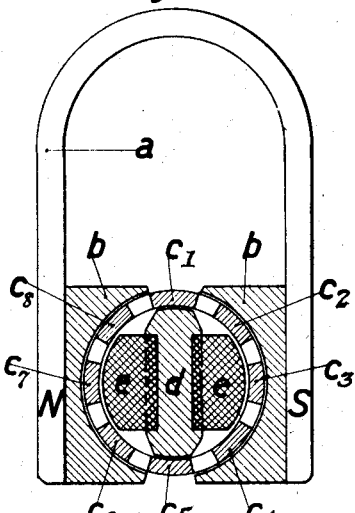

Patented Apr. 1, 1924.

1,488,722

UNITED STATES PATENT OFFICE.

WILHELM WALTHER, OF STUTTGART, GERMANY, ASSIGNOR TO FIRM OF ROBERT BOSCH AKTIENGESELLSCHAFT, OF STUTTGART, GERMANY.

MAGNETO IGNITING DEVICE WITH REVOLVING FLUX CONDUCTOR.

Application filed August 26, 1919. Serial No. 320,069.

*To all whom it may concern:*

Be it known that I, WILHELM WALTHER, a citizen of Germany, residing at and whose post office address is Stuttgart, Kanonenweg 161, Germany, have invented certain new and useful Improvements in Magneto Igniting Devices with Revolving Flux Conductor; and I do hereby declare the following to be a full, clear, and exact description of the invention, such as will enable others skilled in the art to which it appertains to make and use the same.

It is known that the number of rises of potential occurring during one revolution in an ordinary magneto electric igniting machine may be doubled if, instead of rotating the armature, a two-bar flux conductor be caused to revolve between a fixed armature and the pole pieces of the magnet of the machine. The device that regulates the flow of the magnetic lines of force through the iron core of the armature and from the one pole piece of the magnet to the other, takes the form of a cylindrical magnetizable shell that is slotted lengthwise so as to form a cage with a number of bars that act as flux conductors or flux directing members. These flux directing cages have hitherto been used especially for eight cylinder engines, because with such engines they may be driven at the same speed as the crank shaft in order to produce the eight current impulses required for the ignitions in two revolutions, i. e. a total working period of a four cycle engine. If these igniting machines are driven at ¾ of the speed of the crank shaft, they will also be specially suitable for high speed six cylinder motors.

In newly-developed aeroplane engines 12, 16 and even as many as 24 cylinders, and high speeds at that, are employed. The previously mentioned cage type of flux conductors are less suitable for these speeds, because they must be geared to rotate at high rates in order to obtain the large number of ignitions required in a single working period of the pistons.

But it is desirable for durability and reliability of operation to keep the speed of revolution of the ignition machines as low as possible, so that with high speed engines the ignition magneto should, if possible, be driven at the same speed as the crank shaft or not more than 1½ times as fast.

The object of the present invention is to give a means for producing a large number of ignitions at a low ratio of transmission.

The means devised for this purpose according to this invention consists in a magneto-electric ignition generator in which the rotating flux-conducting member or cage has more than two flux-conducting bars, and in which the distribution of the iron of the armature and of the two pole pieces of the field magnet with respect to the number and size of the said flux-conducting bars is such that at each alternation of the voltage a change of the magnetic polarity of the armature iron takes place.

The drawing illustrates a number of ways of carrying out the invention.

Figs. 1 to 4 represents an ignition magneto whose flux-conducting cage has four flux-directing bars, and Figs. 5 to 9 illustrate modified forms of the invention. In all of the figures $a$ denotes the permanent field magnets, $b$ the pole pieces, and, in Figs. 1 to 4, $c^1$, $c^2$, $c^3$, $c^4$ the flux directing bars of the cage that rotates around the armature of double-T shape, $d$ the fixed armature with its coil $e$, N the north pole and S the south pole of the magnets. The arrow indicates the direction in which the cage rotates.

In Fig. 1 the position of the flux-directing bars is such that the lines of force emanating from the north pole of the field magnet pass through the bar $c^1$ into the upper surface of the armature core and out from the lower end of the armature through the bar $c^3$ into the south pole as indicated by the arrows. In this position of the cage the magnetic flux through the armature core reaches its highest value, whilst the induced voltage is zero. As the cage approaches the position shown in Fig. 2 the lines of force passing through the armature decrease. When the position indicated in Fig. 2 is reached, the lines of force pass from the north pole through the flux-directing bars $c^1$ and $c^3$ to the south pole; the magnetic flux through the armature core sinks to its lowest value and then changes its direction, whereupon the induced voltage reaches its highest value, this maximum being utilized in the known manner for the purpose of igniting. In the same measure in which the bars approach the position of Fig. 3 the number of lines of force, passing through the armature core and inducing a current, increase, but they now pass through the armature core in an opposite direction. The induced voltage sinks to zero. In Fig. 4 the lines of force pass from the north pole through the flux-directing bars, the armature pole pieces to the south pole, without passing through the armature core. Thus a maximum of voltage is again obtained as in the case of Fig. 2. The described process is repeated as often as a pair of flux-conducting bars give rise to an alternation of the magnetic flux passing through the iron core of the armature. This device thus produces 8 maxima of voltage during a single revolution, so that if a magneto generator of this kind is employed in conjunction with a 16 cylinder engine that requires 16 ignitions in two revolutions, it must be driven at the same speed as the crank shaft.

A somewhat modified type of magneto is shown in Fig. 5 in which a two-bar cage or shell $f$, that is coupled with the stationary armature, is interposed between the revolving four-bar cage and the two field pole pieces. By turning the cage $f$ and the armature $d$ in the direction of rotation of the cage $c^{1-4}$, or in the opposite direction, an earlier or a later change of the direction of the lines of force in the armature, and thus an earlier or a later moment of ignition, is obtained.

Further modifications are shown in Figs. 6-9. Fig. 6 represents an ignition machine with 3 flux-directing bars. Fig. 7 a machine with 5, Fig. 8 with 6, and Fig. 9 with 8 flux-directing bars; and the shapes of the two field pole pieces and of the armature required for these numbers of bars are also illustrated in these figures. From these it follows that in the case of an uneven number of flux-directing bars, an uneven distribution of the iron forming the two field pole pieces, is required. The air gaps between the edges of the field pole pieces of opposite signs, and the armature core, are located upon the sides of an angle (Figs. 6 and 7) that is determined by radii which pass through two flux-directing bars of the greatest possible angular distance from each other. The number of maximum values of voltage obtained during a single revolution is in each case twice the number of flux-directing bars.

I claim:

In a magneto-electric ignition apparatus, the combination of a field magnet with pole shoes, a stationary double-T armature with useful current winding arranged on the armature bar, and a guide piece for the lines of force of more than two segments, said guide-piece rotating around the armature and conveying the lines of force from the magnet pole-shoes to the armature, the stationary iron conveying the magnetic lines of force being so arranged that at a time only two segments of the rotary guide-piece transmit the flux through the iron core of the useful-current winding.

In testimony whereof I affix my signature, in presence of two witnesses.

WILHELM WALTHER.

Witnesses:
ADOLF LEBBERS,
HERMANN SCHNEIDER.